US009458727B2

(12) United States Patent
Shen

(10) Patent No.: US 9,458,727 B2
(45) Date of Patent: Oct. 4, 2016

(54) TURBINE COMPONENT HAVING A LOW RESIDUAL STRESS FERROMAGNETIC DAMPING COATING

(71) Applicant: Mo-How Herman Shen, Dublin, OH (US)

(72) Inventor: Mo-How Herman Shen, Dublin, OH (US)

( * ) Notice: Subject to any disclaimer, the term of this patent is extended or adjusted under 35 U.S.C. 154(b) by 400 days.

(21) Appl. No.: 14/202,314

(22) Filed: Mar. 10, 2014

(65) Prior Publication Data

US 2014/0186653 A1    Jul. 3, 2014

Related U.S. Application Data

(60) Division of application No. 13/169,491, filed on Jun. 27, 2011, now abandoned, which is a continuation-in-part of application No. 11/736,093, filed on Apr. 17, 2007, now abandoned, which is a (Continued)

(51) Int. Cl.
*F01D 5/28* (2006.01)
*B32B 15/01* (2006.01)
(Continued)

(52) U.S. Cl.
CPC ............ *F01D 5/288* (2013.01); *B32B 15/01* (2013.01); *C22C 19/07* (2013.01); *C22C 38/06* (2013.01);
(Continued)

(58) Field of Classification Search
CPC ..... B32B 15/01; B32B 15/012; B32B 15/18; B32B 15/20; B32B 15/04; B32B 15/043; C22C 19/07; C22C 38/06; C22C 38/18; C22C 38/22; C23C 4/08; C23C 4/129; C23C 30/00; C23C 24/04; C23C 4/04; C23C 4/06; C23C 4/073; C23C 4/12; C23C 28/02; C23C 28/021; C23C 28/022; C23C 30/005; Y10T 428/12951; Y10T 428/12778; Y10T 428/12757; Y10T 428/12806; Y10T 428/2495; Y10T 428/24942; Y10T 428/12958; Y10T 428/12972; Y10T 428/12979; Y10T 428/12931; Y10T 428/12937; Y10T 428/1275
See application file for complete search history.

(56) References Cited

U.S. PATENT DOCUMENTS 3,301,530 A    1/1967    Lull
3,758,233 A    9/1973    Cross et al.
(Continued)

OTHER PUBLICATIONS

Y. Yen and M.H. Herman Shen, "Passive Vibration Suppression of Beams Using Magnetomechanical Coating," Vibration and Noise Control, DE-vol. 97/DSC-vol. 65, ASME, 1998.

(Continued)

*Primary Examiner* — Michael E La Villa
(74) *Attorney, Agent, or Firm* — David J. Dawsey; Michael J. Gallagher; Gallagher & Dawsey Co., LPA

(57) ABSTRACT

A turbine component having a low residual stress ferromagnetic damping coating. The ferromagnetic damping coating may include a ferromagnetic damping material applied in at least partially molten powder form, which may be directed at a surface of the substrate at an application velocity so that it causes partial plastic deformation of the surface while adhering to the surface of the substrate and solidifying in less than 3 seconds to create a ferromagnetic damping coating, resulting in a coated substrate. The ferromagnetic damping coating has a balanced coating residual stress, including a tensile quenching stress component and a compressive peening stress component. The balanced coating residual stress is within a range of ±50 MPa without having to subject the coated substrate to a high temperature annealing process. The resulting coated substrate exhibits a high damping capacity.

20 Claims, 5 Drawing Sheets

Related U.S. Application Data continuation-in-part of application No. 11/215,195, filed on Aug. 30, 2005, now abandoned.

(60) Provisional application No. 60/606,890, filed on Sep. 3, 2004.

(51) Int. Cl.

| | | |
|---|---|---|
| *B32B 15/04* | (2006.01) | |
| *B32B 15/18* | (2006.01) | |
| *C23C 30/00* | (2006.01) | |
| *C22C 19/07* | (2006.01) | |
| *C22C 38/06* | (2006.01) | |
| *C22C 38/18* | (2006.01) | |
| *C22C 38/22* | (2006.01) | |
| *C23C 4/08* | (2016.01) | |
| *C23C 24/04* | (2006.01) | |

(52) U.S. Cl.
CPC ............... *C22C 38/18* (2013.01); *C22C 38/22* (2013.01); *C23C 4/08* (2013.01); *C23C 4/129* (2016.01); *C23C 24/04* (2013.01); *C23C 30/00* (2013.01); *C23C 30/005* (2013.01); *Y10T 428/1275* (2015.01); *Y10T 428/12757* (2015.01); *Y10T 428/12778* (2015.01); *Y10T 428/12806* (2015.01); *Y10T 428/12931* (2015.01); *Y10T 428/12937* (2015.01); *Y10T 428/12951* (2015.01); *Y10T 428/12958* (2015.01); *Y10T 428/12972* (2015.01); *Y10T 428/12979* (2015.01); *Y10T 428/2495* (2015.01); *Y10T 428/24942* (2015.01)

(56) References Cited

U.S. PATENT DOCUMENTS

| | | | |
|---|---|---|---|
| 4,380,574 | A | 4/1983 | Gessinger et al. |
| 4,788,077 | A | 11/1988 | Kang |
| 5,077,140 | A | 12/1991 | Luthra et al. |
| 5,498,137 | A | 3/1996 | El-Aini et al. |
| 5,820,348 | A | 10/1998 | Fricke |
| 5,924,845 | A | 7/1999 | Bagley et al. |
| 6,001,426 | A | 12/1999 | Witherspoon |
| 6,059,533 | A | 5/2000 | Stoker et al. |
| 6,471,484 | B1 | 10/2002 | Crall |
| 6,514,040 | B2 | 2/2003 | Lewis et al. |
| 6,547,049 | B1 | 4/2003 | Tomlinson |
| 6,679,788 | B1 | 1/2004 | Heinrich et al. |
| 6,796,408 | B2 | 9/2004 | Sherwin et al. |
| 6,815,099 | B1 | 11/2004 | Zajchowski et al. |
| 6,827,551 | B1 | 12/2004 | Duffy et al. |
| 2004/0096332 | A1 | 5/2004 | Shipton et al. |
| 2007/0099014 | A1 | 5/2007 | McCullough et al. |
| 2008/0124480 | A1 | 5/2008 | Shen |
| 2008/0226879 | A1 | 9/2008 | Strock et al. |
| 2009/0053068 | A1 | 2/2009 | Hardwicke et al. |
| 2009/0317236 | A1* | 12/2009 | Hardwicke ........... C23C 28/321 415/119 |
| 2010/0136254 | A1 | 6/2010 | Darolia et al. |

OTHER PUBLICATIONS

Y. Yen and M.H. Herman Shen, "Passive Vibration Suppression of Turbine Blades Using Magnetomechanical Coating" 4th National Turbine Engine High Cycle Fatigue Conference, Feb. 1999.

Y. Yen and M.H. Herman Shen, "Magnetomechanical Coating Applications in Vibration Suppression of Turbine Blades," 5th National Turbine High Cycle Fatigue Conference Mar. 2000.

Y. Yen and M.H. Herman Shen, 2000-GT-366 "Development of a Passive Turbine Blade Damper Using Magnetomechanical Coating," Proceeding of ASME International Gas Turbine & Aeroengine Congress & Exhibition, May 2000.

Y. Yen and M.H. Herman Shen, "Passive Vibration Suppression of Turbine Blades Using Magnetomechanical Coating," Journal of Sound and Vibration, vol. 245, No. 4, pp. 701-744, 2001.

M.H. Herman Shen, "Development of a Free Layer Damper Using Hard Coatings," 7th National Turbine Engine High Cycle Fatigue Conference, May 2002.

Herman Shen, "Free Layer Damper by Magneto-Mechanical Coating," 10th National Turbine Engine High Cycle Fatigue Conference, Mar. 2005.

A. Karimi, CH. Azcoitia, and J. DeGauque, "Relationships Between Magnetomechanical Damping and Magnetic Properties of Fe—Cr (Al,Mo) Alloys" Journal of Magnetism and Magnetic Materials 215-216, 2000.

CH. Azcoitia and A. Karimi, "Magnetomechanical Damping in Fe-Cr Alloys and Effect of Al and Mo Addition," Journal of Alloys and Compounds 310, pp. 160-164, 2000.

D. Pulino-Sagradi, M. Sagradi, A. Karimi and J.L. Martin,"Damping Capacity of Fe—Cr—X High-Damping Alloys and Its Dependence on Magnetic Domain Stucture," Scripta Materialia vol. 39, No. 2, pp. 131-138, 1998.

A. Karimi et al, "High Damping Capacity Coatings for Surface Vibration Control," Journal De Pysiques IV,Colloque C8, supplement au Journal de Physique III, vol. 6, Dec. 1996.

T. Lillo and R. Wright, Microstructure, Processing, Performance Relationships for High Temperature Coatings, 22nd Annual Conference on Fossil Energy Materials, Jul. 8-10, 2008.

C. Lyphout, P. Nylen, and J. Wigren, "Characterization of Adhesion Strength and Residual Stresses of HVOF Sprayed Inconel 718 for Aerospace Repair Applications," International Thermal Spray Conference and Exposition, May 14-16, 2007.

Nternational Searching Authority (USPTO), International Search Report and Written Opinion for International Application No. PCT/US2012/040978, mailed Aug. 31, 2012, 8 pages.

\* cited by examiner

TURBINE COMPONENT HAVING A LOW RESIDUAL STRESS FERROMAGNETIC DAMPING COATING

CROSS REFERENCE TO RELATED APPLICATIONS

This application is a divisional application of U.S. application Ser. No. 13/169,491, filed on Jun. 27, 2011, which is a continuation-in-part of U.S. application Ser. No. 11/736, 093, filed Apr. 17, 2007, now abandoned, which is a continuation-in-part of U.S. application Ser. No. 11/215,195, filed Aug. 30, 2005, now abandoned, which claimed priority to and the benefit of U.S. Provisional Application No. 60/606,890, filed Sep. 3, 2004, the entire contents of which are hereby incorporated by reference. Moreover, the entire disclosure provided in Applicant's U.S. Patent Application Publication No. 2008/0124480, published on May 29, 2008, is hereby incorporated by reference.

STATEMENT REGARDING FEDERALLY SPONSORED RESEARCH OR DEVELOPMENT

Part of the invention herein described was made in the course of or under a contact with the U.S. Department of the Navy.

TECHNICAL FIELD

The present disclosure relates to coatings applied to a surface of a substrate. More specifically, the present disclosure is directed to a method for applying a low residual stress damping coating to a surface of a substrate.

BACKGROUND OF THE INVENTION

Engineering components, particularly rotating components such as turbine fan blades, compressor blades, impellers, blisks, and integrally bladed rotors (IBRs), commonly encounter vibrational stresses in operation. These vibrational stresses can fatigue the component and eventually cause the component to fail. In order to prevent component failure, researchers have investigated a number of approaches for attenuating the vibrations that develop under cyclic loading. Such approaches have included dry friction dampers, tuned-mass or particles, air cavities, shape memory alloys, viscoelastic dampers, and ceramic coatings.

Another approach that has been considered for vibration damping is the application of a thin coating of a ferromagnetic material on a surface of a substrate. In particular, Fe—Cr based ferromagnetic materials comprising about 16% (by weight) chromium (Cr), either about 1% to about 6% aluminum (Al) or about 1% to about 4% molybdenum (Mo), and the balance iron (Fe), have been shown to exhibit high damping, as well as good mechanical strength and corrosion resistance. As a result, the Fe—Cr based ferromagnetic materials are considered well-suited for applications involving severe and hostile operating conditions, such as those experienced by turbine components.

As mentioned, Fe—Cr based ferromagnetic materials have been shown to possess a high damping capacity. These ferromagnetic materials include magnetic domains, which are separated by magnetic domain walls. When the ferromagnetic material is exposed to external magnetic fields or stresses, the magnetic domain walls can move. When the movement of the magnetic domain walls is irreversible, a portion of the energy provided to the ferromagnetic material is dissipated as internal friction. This damping mechanism is commonly referred to as magneto-mechanical damping.

Thus, high damping in ferromagnetic materials is achieved due to the irreversible movement of the magnetic domain walls. If movement of the magnetic domain walls is constrained or hindered, the ferromagnetic material will not exhibit any appreciable damping. Unfortunately, conventional coating processes create large residual stresses that act as obstacles to the movement of the magnetic domain walls. For example, in a conventional air plasma spray process, the residual stress is dominated by tensile quenching stresses; while in a conventional cold spray process, the residual stress is dominated by compressive peening stresses. As a result, a ferromagnetic coating applied to a substrate by conventional coating processes will provide no significant damping. In order to free up the movement of the magnetic domain walls, the common course of action is to subject the coated article to a high temperature annealing process. For example, a suggested process comprises annealing in high vacuum at temperatures between 700° C. and 1200° C. for 30 minutes to 6 hours, followed by furnace cooling at 120° C./h.

The high temperature annealing process is a critical drawback that has hindered the use of ferromagnetic materials in real world applications. For example, high temperature annealing of geometrically complex structural components, such as gas turbine engine components, can cause microstructural defects, decomposition and precipitation in component substrate materials, and most importantly can warp or deform the structural component rendering the component unfit for its intended use.

Thus there is a need in the art for a process capable of depositing a coating comprising a ferromagnetic damping material on a surface of a substrate that exhibits a high damping capacity without having to undergo a high temperature annealing process. The presently disclosed method satisfies this need.

SUMMARY OF THE INVENTION

In its most general configuration, the presently disclosed method for applying a low residual stress damping coating advances the state of the art with a variety of new capabilities and overcomes many of the shortcomings of prior methods in new and novel ways. The method for applying a low residual stress damping coating overcomes the shortcomings and limitations of the prior art in any of a number of generally effective configurations.

The present disclosure relates to a method for applying a low residual stress damping coating on a surface of a substrate. The method provides a technique for increasing the damping of a substrate having a substrate thickness. Generally, the method includes heating a ferromagnetic damping material in powder form such that the ferromagnetic damping material is at least partially molten. Next, the at least partially molten ferromagnetic damping material is directed at a surface of the substrate at an application velocity such that the at least partially molten ferromagnetic damping material adheres to the surface of the substrate. The ferromagnetic damping material then cools to solidification within a solidification period to create a ferromagnetic damping coating on the surface of the substrate, resulting in a coated substrate.

The ferromagnetic damping coating has a balanced coating residual stress, which includes at least a tensile quenching stress component and a compressive peening stress component. In general, the balanced coating residual stress is within a range of ±50 MPa without the coated substrate ever being subjected to an annealing temperature of above 700° C. for an annealing period of longer than 30 minutes. The ferromagnetic damping coating may have a coating thickness of about 2% (or about 1% on each side of the substrate) to about 20% of the substrate thickness. The resulting coated substrate has a damping loss factor of at least $3.6 \times 10^{-3}$ at a strain amplitude of $0.0466 \times 10^{-4}$ to $7.77 \times 10^{-4}$.

The presently disclosed method thus provides the ability to deposit a coating comprising a ferromagnetic damping material on a surface of a substrate that exhibits a high damping capacity without having to undergo a high temperature annealing process.

BRIEF DESCRIPTION OF THE DRAWINGS

Without limiting the scope of the claimed method for applying a low residual stress damping coating, reference is now given to the drawings and figures:

DETAILED DESCRIPTION OF THE INVENTION

The presently disclosed method for applying a low residual stress damping coating enables a significant advance in the state of the art. The preferred embodiments of the method accomplish this by new and novel arrangements of elements and steps that are configured in unique and novel ways and which demonstrate previously unavailable but preferred and desirable capabilities. The description set forth below in connection with the drawings is intended merely as a description of the embodiments of the claimed method, and is not intended to represent the only form in which the method may be constructed, carried out, or utilized. The description sets forth the designs, functions, means, and methods of implementing the method in connection with the illustrated embodiments. It is to be understood, however, that the same or equivalent functions and features may be accomplished by different embodiments that are also intended to be encompassed within the spirit and scope of the claimed method.

Figure 1:
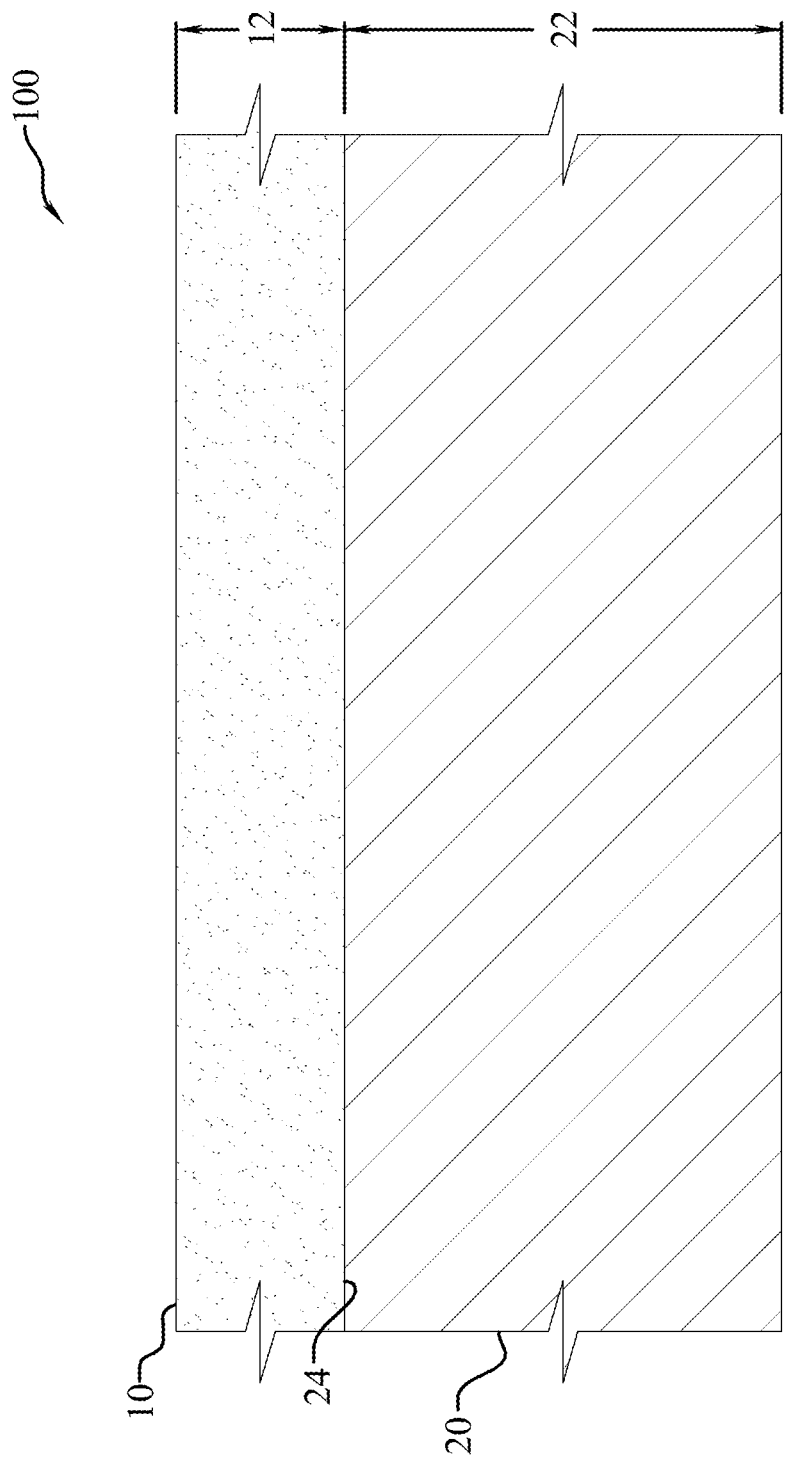
FIG. 1 is a cross-sectional view of a substrate with a low residual stress ferromagnetic damping coating applied to a surface thereof, not to scale.

With reference now to FIG. 1, a cross-sectional view of a substrate (20) having a low residual stress ferromagnetic damping coating (10) applied to a surface (24) of the substrate (20) is shown. Preferably, the ferromagnetic damping material utilized to create the low residual stress ferromagnetic damping coating (10) comprises a Fe—Cr based ferromagnetic damping material comprising about 16% (by weight) chromium (Cr), either about 1% to about 6% aluminum (Al) or about 1% to about 4% molybdenum (Mo), and the balance iron (Fe). However, other ferromagnetic damping materials may be successfully utilized, including, but not limited to, Co-(22-38 wt %)Ni and Fe-(11-22 wt %)Mn. The substrate (20) may comprise a turbine component, such as a fan blade, compressor blade, impeller, blisk, or integrally bladed rotor, just to name a few. The turbine component may be formed of virtually any metal including, but not limited to, titanium, titanium-based alloys, steel alloys, nickel, nickel-based alloys, aluminum, and aluminum-based alloys. As used herein, the term "turbine" may refer to gas turbines, steam turbines, water turbines, wind turbines, or any other type of turbine or components thereof that experience vibrational stresses.

Figure 2:
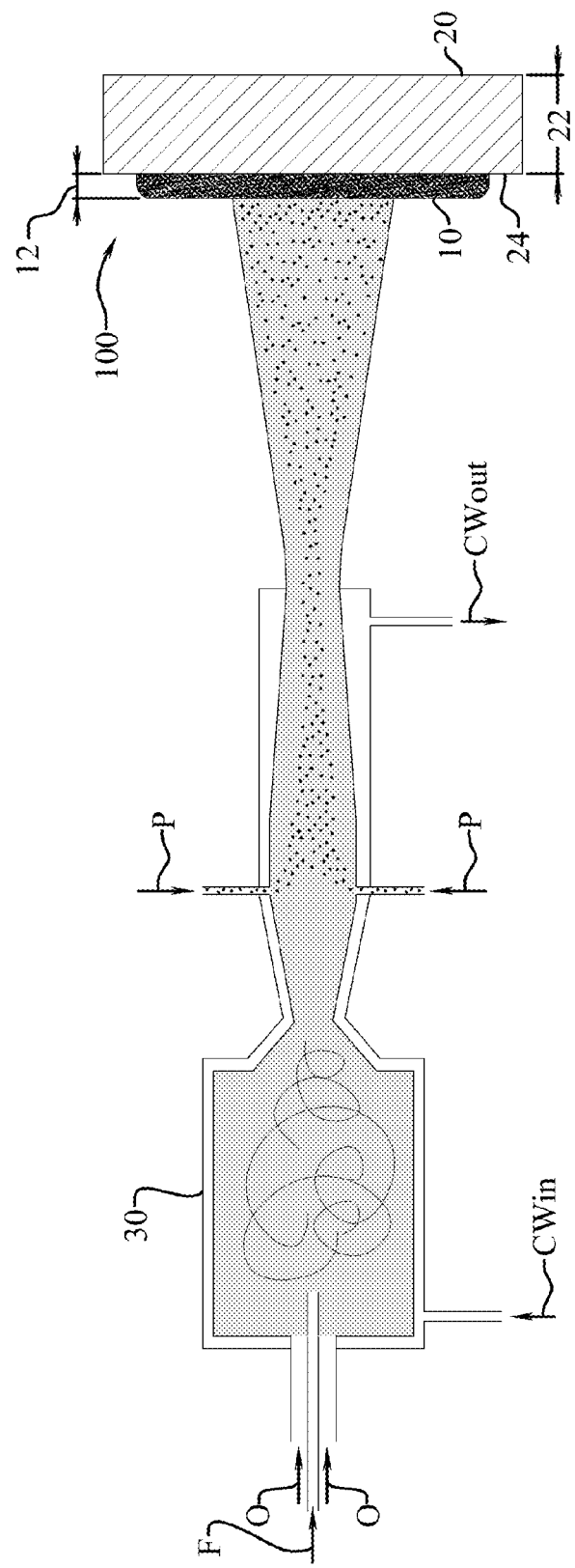
FIG. 2 is a schematic of a spray torch applying a low residual stress ferromagnetic damping coating on a surface of a substrate, not to scale.

With reference now to FIG. 2, an embodiment of a method for applying a low residual stress ferromagnetic damping coating (10) to a surface (24) of a substrate (20) will be described. As seen in FIG. 2, a spray torch (30) for applying the low residual stress ferromagnetic damping coating (10) is directed at the surface (24) of the substrate (20). The spray torch (30) preferably comprises a high velocity oxygen fuel (HVOF) type torch, such as those used in connection with the Praxair-Tafa JP-5000 HVOF spray system and Jet Kote spray systems. In a HVOF spray system, a mixture of fuel (F) and oxygen (O) is fed to the spray torch (30) where the mixture is combusted. A coating material in powder (P) form is fed to the spray torch (30) where the powder (P) particles are entrained by the combustion gases and undergo heating and acceleration as they travel through and exit the spray torch (30). The spray torch (30) may be supplied with cooling water (CW) to help control the temperature of the process.

The presently disclosed method provides a technique for increasing the damping of a substrate (20) having a substrate thickness (22). In one embodiment, the method includes heating a ferromagnetic damping material in powder form such that the ferromagnetic damping material is at least partially molten. The heating step may be accomplished in the spray torch (30) from the hot combustion gases as described above. To ensure that the ferromagnetic damping material is at least partially molten, it is preferable to heat the ferromagnetic damping material to, or near, its melting point.

Next, the at least partially molten ferromagnetic damping material is directed at a surface (24) of the substrate (20) at an application velocity. The application velocity is such that the at least partially molten ferromagnetic damping material adheres to the surface (24) of the substrate (20). After the at least partially molten ferromagnetic damping material adheres to the surface (24) of the substrate (20), it cools to solidification within a solidification period to create a ferromagnetic damping coating (10) on the surface (24) of the substrate (20), thus forming a coated substrate (100). The solidification period is relatively rapid, generally less than a few seconds.

The key aspect of the method lies in the fact that the resulting ferromagnetic damping coating (10) has a balanced coating residual stress. The balanced coating residual stress includes at least a tensile quenching stress component and a compressive peening stress component. The tensile quenching stress component is contributed by the cooling and contraction of the at least partially molten ferromagnetic damping material on the surface (24) of the substrate (20). On the other hand, the compressive peening stress component is induced by the at least partially molten ferromagnetic damping material impacting the surface (24) of the substrate (20), or coating (10), at high velocity causing a slight plastic deformation of the substrate (20) or coating (10). It has been appreciated that by carefully controlling the application temperature and the application velocity of the ferromagnetic damping material, the compressive peening stress component may be increased and the tensile quenching stress component may be decreased. As a result, the ferromagnetic damping coating (10) has a balanced coating residual stress, where the compressive peening stress component and the tensile quenching stress component effectively cancel, or balance, one another to provide the balanced coating residual stress.

This discovery has enabled the ability to apply a ferromagnetic damping coating (10) on a surface (24) of a substrate (20) that achieves high damping without having to subject the coated substrate (100) to a high temperature annealing process, such as annealing at an annealing temperature of above 700° C. for an annealing period of longer than 30 minutes, followed by a controlled furnace cooling. The high damping is a direct result of the ferromagnetic damping coating's (10) balanced coating residual stress, which is believed to create a substantially smaller amount of obstacles (i.e., pinning sites) that hinder the movement of the magnetic domain walls within the ferromagnetic damping coating (10). Applicant has found that a balanced coating residual stress within a range of ±50 MPa (with positive values representing a tensile residual stress and negative values representing a compressive residual stress) allows a high level of damping in the ferromagnetic damping coating (10). As used herein, the phrase "balanced coating residual stress" refers to a residual stress of the coating (10) within a range of ±50 MPa. As a result of the discovery of the balanced coating residual stress, geometrically complex structural components, such as gas turbine components, may be damped with a ferromagnetic damping coating (10) without suffering the drawbacks associated with the high temperature annealing process.

In a particular embodiment, the at least partially molten ferromagnetic damping material is directed at the substrate at an application temperature of at least 800° C. and at an application velocity of at least 450 m/s. These application parameters provide a delicate balance between the thermal and kinetic energy imparted upon the ferromagnetic damping material to obtain a balanced coating residual stress within the ±50 MPa range to achieve a high level of damping from the ferromagnetic damping coating (10).

Generally, the ferromagnetic damping coating (10) is applied as a thin layer. Applicant has found that applying a ferromagnetic damping coating (10) having a coating thickness (12) of about 2% to about 20% of the substrate thickness (22) allows the ferromagnetic damping coating (10) to provide damping without having an adverse effect on the substrate (20). For example, when the substrate (20) comprises a component of a gas turbine, a coating thickness (12) that is too large can decrease the efficiency and operability of the gas turbine component. In one embodiment, the ferromagnetic damping coating (10) may be deposited one side of the substrate (20); while in other embodiments, the ferromagnetic damping coating (10) may be deposited on more than one side of the substrate (20). As used herein, coating thickness (12) refers to the total thickness of the ferromagnetic damping coating (10) applied to the substrate (20).

As will be seen in the example presented below, the coated substrate (100) resulting from the presently disclosed method has a higher level of damping compared to substrates that are coated using conventional coating processes. In general, the coated substrate (100) resulting from the presently disclosed process was found to have a system loss factor (i.e., damping loss factor) of at least $3.6 \times 10^{-3}$ at strain amplitude of between $0.0466 \times 10^{-4}$ to $7.77 \times 10^{-4}$.

To illustrate the effectiveness of the method, reference will now be made to an example. In this example, a Praxair-Tafa JP-5000 HVOF spray system was utilized to carry out the method. The ferromagnetic damping material utilized was Fe-16Cr-3Mo. The substrate (20) comprised a Ti-6Al-4V beam having dimensions of 8.0 in×0.75 in×0.090 in. Oxygen at a supply pressure of 210 psi was fed to the spray torch (30) at a flow rate of 1800 scfh with a pressure of 123±5 psi. The fuel comprised kerosene at a supply pressure of 170 psi, and was fed to the spray torch (30) at a flow rate of 5.1 gallons/hour with a pressure of 108±5 psi. The combustion pressure was maintained at 94±5 psi. The powdered ferromagnetic damping material was injected to the spray torch (30) via a powder feeder speed of 270 rpm and a nitrogen carrier gas at a flow rate of 22±2 scfh at a supply pressure of 50 psi. Cooling water was supplied to the spray torch (30) at a temperature of 56±5° F. and exited the spray torch (30) at a temperature of 102±5° F.

The spray torch (30) was positioned from the surface (24) of the substrate (20) at a standoff distance of 14 inches, and the ferromagnetic damping material was deposited on the surface (24) of the substrate (20) at a damping material deposition rate of about 76±5 grams/minute. In this particular example, each side of the substrate (20) beam was coated with the ferromagnetic damping material with a coating thickness (12) of about 0.004-0.005 inch per side, resulting in a coating thickness (12) to substrate thickness (22) ratio of about 8% to about 10% (or about 4% to about 5% each side).

For purposes of comparison, two additional Ti-6Al-4V beams were coated with the same ferromagnetic damping material using a conventional cold spray process and a conventional air plasma spray process. The two additional Ti-6Al-4V beams had the same dimensions as the substrate (20) noted above, as well as the same coating thickness (12).

Figure 3:
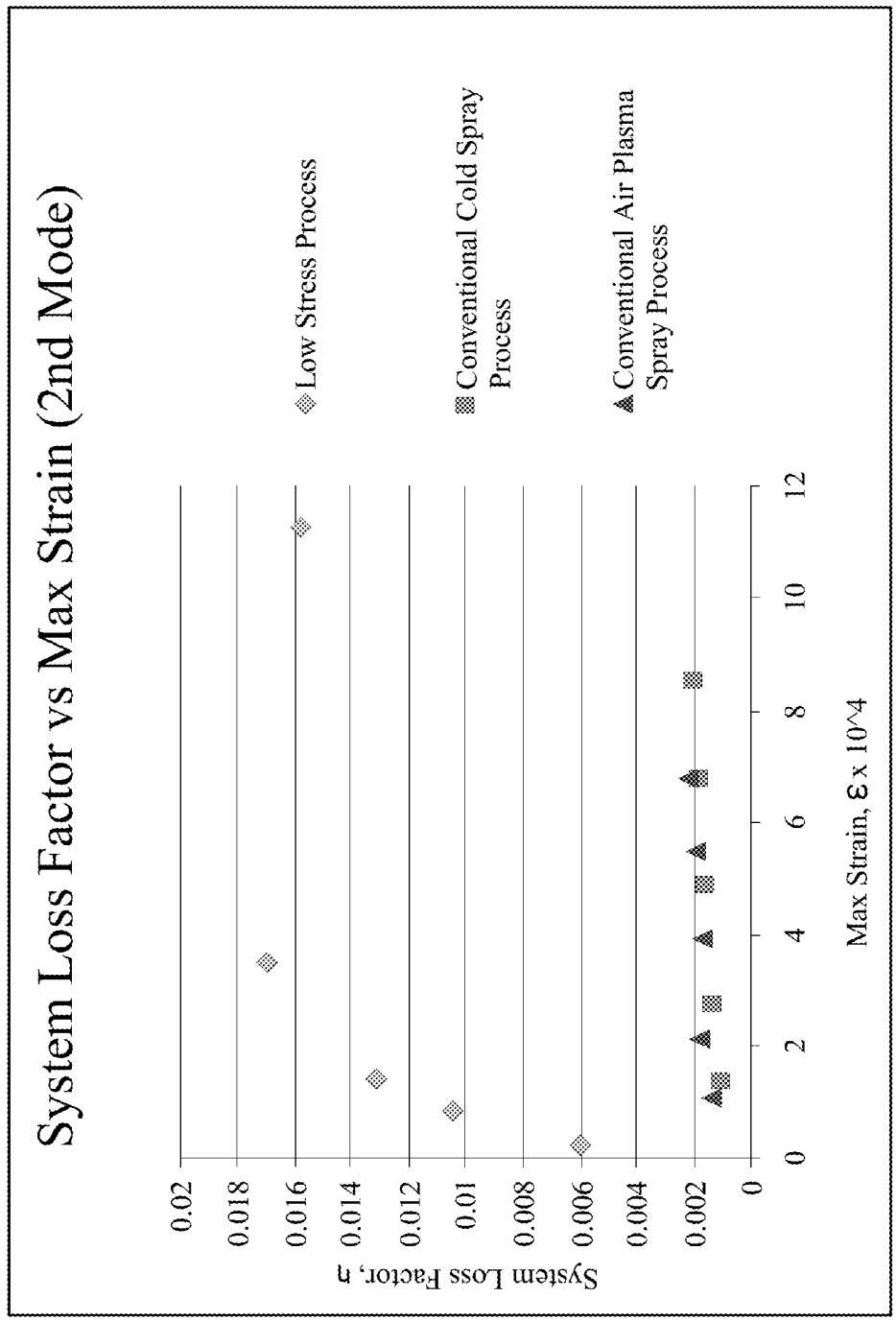
FIG. 3 shows a graph of the system loss factor versus max strain at the second bending mode for three beams coated by different processes.
Figure 4:
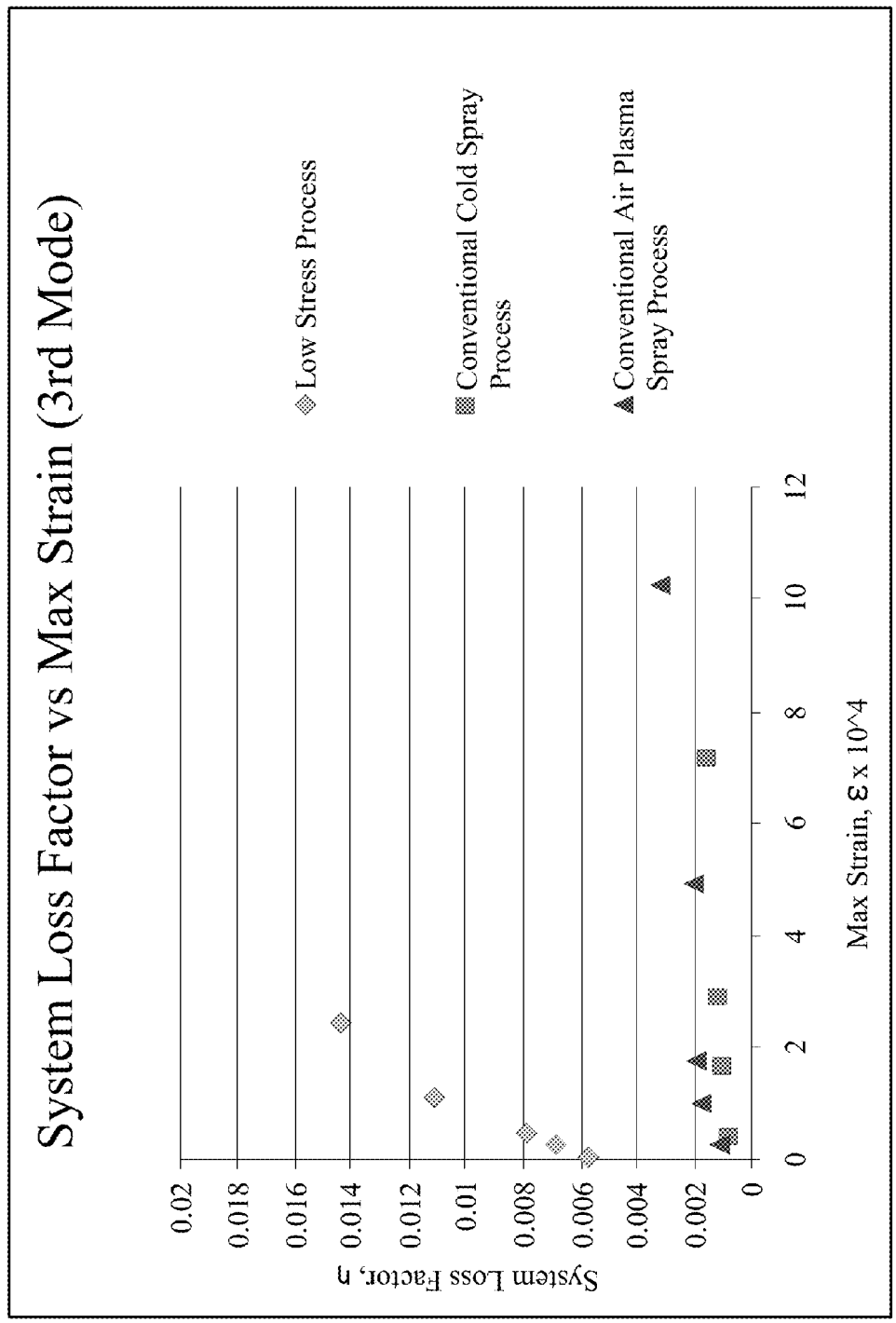
FIG. 4 shows a graph of the system loss factor versus max strain at the third bending mode for three beams coated by different processes.
Figure 5:
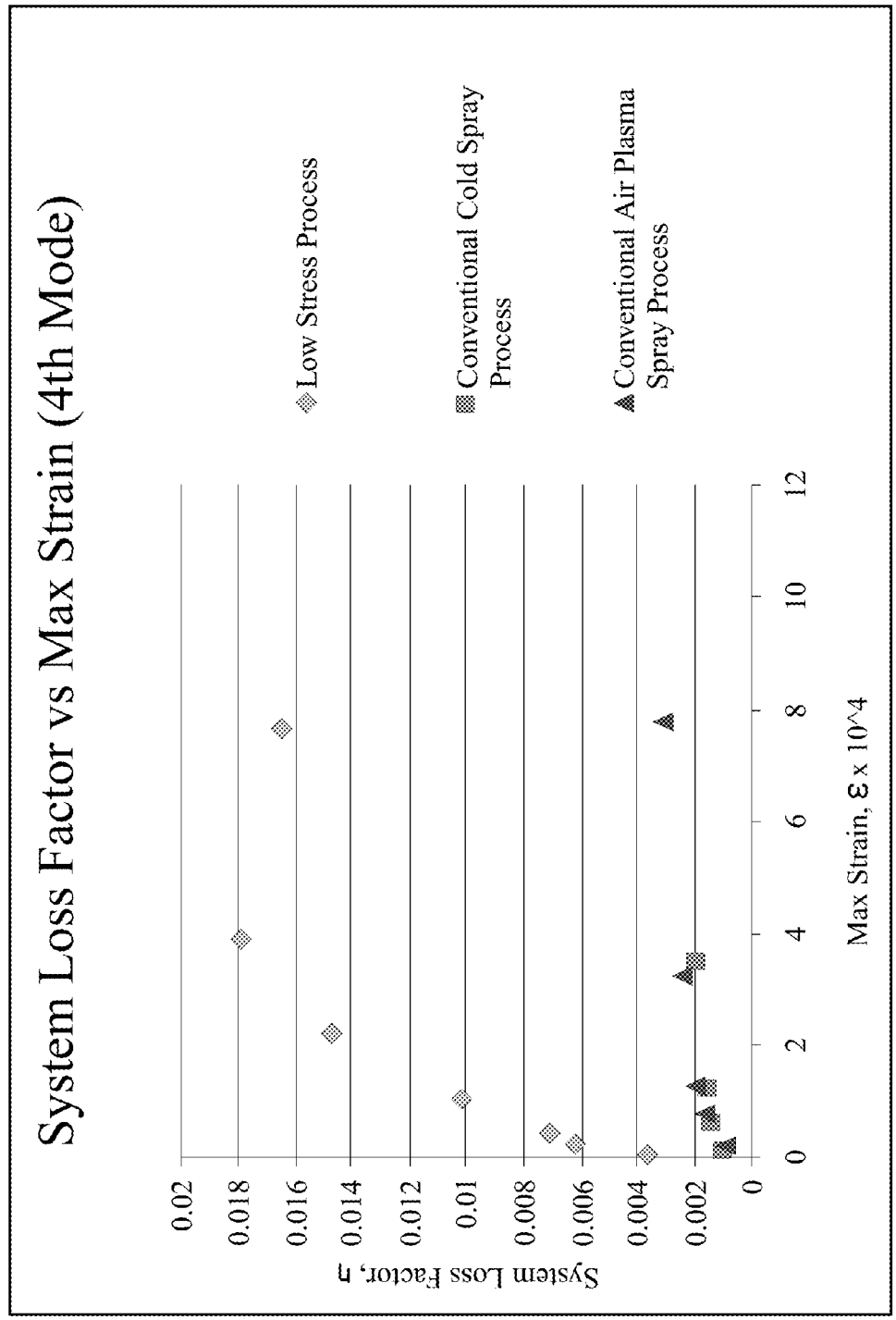
FIG. 5 shows a graph of the system loss factor versus max strain at the fourth bending mode for three beams coated by different processes.

Turning now to FIGS. 3-5, the vibration damping associated with each of the three separately coated beams (presently disclosed process, conventional cold spray process, and conventional air plasma spray process) is depicted graphically in terms of the system loss factor (η) versus max strain (ε). Each coated beam was cantilever clamped on a high power vibration shaker. Frequency response functions for each coated beam were measured utilizing an accelerometer and a laser-vibrometer for measuring the velocity or displacement of a point on the coated beam. The system loss factor (i.e., damping loss factor) was calculated using the half-power bandwidth method. According to the half-power bandwidth method, a reference point on the frequency response function of $\sqrt{2}/2$, or 0.707, of the maximum amplitude is chosen. This amplitude crosses the frequency response function at two different frequencies, with the difference between these two different frequencies being the half-power band. The relationship between the half-power band and the frequency of the maximum amplitude (i.e., resonant frequency) is the measurement of the system loss factor (η), which can be seen by the following equation:

$$\eta \approx \frac{\text{half} - \text{power band}}{\text{resonant frequency}}$$

The strain on each coated beam was determined via finite element method to correlate the displacement of the coated beam at a point to the strain at the root of the coated beam.

The actual displacement at a specific point was then calculated from the measured velocity at that point while vibrating in a resonant mode. The following equation was used to calculate the displacement:

$$d=v/(2\pi f)$$

where "v" is the measured velocity of the coated beam at a point and "f" is the measured resonant frequency.

The strain at any point on the coated beam can then be determined from the calculated displacement of the coated beam and the mode shape. For the graphs shown in FIGS. 3-5, the coated beams were excited in cantilever bending modes (i.e., second bending mode, third bending mode, and fourth bending mode) and the data is referred to in terms of the max strain amplitude in the mode shape, which occurs at the root of the specimen. Using the finite element method, it is possible to find a conversion factor between observed displacement and root strain.

As seen in FIGS. 3-5, the system loss factor (i.e., damping loss factor) of the beam coated with the presently disclosed process (i.e., "low stress process") is significantly higher than the beams coated via the conventional cold spray and air plasma spray processes in each of the second, third, and fourth bending modes. In fact, the system loss factor of the beam coated by the "low stress process" was about 300-1000% higher than the beams coated by the conventional cold spray and air plasma spray processes. It is important to note that the system loss factor is independent of the vibratory mode of coated substrates. As a result, the ferromagnetic damping coating is capable of enhancing damping significantly at almost all the vibration modes of the coated substrate.

In FIG. 3, the lowest value of the system loss factor observed at the second bending mode for the "low stress process" was $5.9 \times 10^{-3}$ at a max strain amplitude of $0.227 \times 10^{-4}$, while the highest value of the system loss factor was $16.9 \times 10^{-3}$ at a max strain amplitude of $3.51 \times 10^{-4}$. In comparison, the highest values of the system loss factor at the second bending mode for the cold spray process was $2.0 \times 10^{-3}$ at a max strain amplitude of $8.56 \times 10^{-4}$, and for the air plasma spray process was $2.22 \times 10^{-3}$ at a max strain amplitude of $6.78 \times 10^{-4}$. As can be appreciated, the "low stress process" resulted in a significantly higher level of damping when compared to the conventional cold spray and air plasma spray processes. In fact, the highest level of damping observed for the cold spray and air plasma spray processes were each less than half of the lowest level of damping observed for the "low stress process."

Similar results were obtained for the third bending mode, as seen in FIG. 4. The lowest value of the system loss factor observed for the "low stress process" was $5.72 \times 10^{-3}$ at a max strain amplitude of $0.0568 \times 10^{-4}$, while the highest value of the system loss factor was $14.3 \times 10^{-3}$ at a max strain amplitude of $2.44 \times 10^{-4}$. On the other hand, the highest observed system loss factor for the beam coated with the conventional cold spray process was $1.60 \times 10^{-3}$ at a max strain amplitude of $7.19 \times 10^{-4}$, and the highest system loss factor for the beam coated with the air plasma spray process was $3.28 \times 10^{-3}$ at a max strain amplitude of $10.25 \times 10^{-4}$. Again, for the third bending mode, the lowest value of the system loss factor for the "low stress process" was still significantly higher than the highest value of the system loss factor for the beams coated by the cold spray and air plasma spray processes.

Still further promising results were obtained with respect to the fourth bending mode, as seen in FIG. 5. For the fourth bending mode, the lowest value of the system loss factor observed for the "low stress process" was $3.6 \times 10^{-3}$ at a max strain amplitude of $0.0466 \times 10^{-4}$, while the highest value of the system loss factor was $17.9 \times 10^{-3}$ at a max strain amplitude of $3.88 \times 10^{-4}$. On the other hand, the highest observed system loss factor for the beam coated with the conventional cold spray process was $1.91 \times 10^{-3}$ at a max strain amplitude of $3.52 \times 10^{-4}$, and the highest system loss factor for the beam coated with the air plasma spray process was $3.13 \times 10^{-3}$ at a max strain amplitude of $7.77 \times 10^{-4}$. As with the second and third bending modes, at the fourth bending mode the lowest value of the system loss factor for the "low stress process" was still higher than the highest value of the system loss factor for the beams coated by the cold spray and air plasma spray processes.

Although the example discussed utilized a Praxair-Tafa JP-5000 HVOF spray system, those with skill in the art will appreciate that other spray systems capable of achieving the preferred parameters of the method may be successfully implemented. Applicant has performed the method utilizing a Jet Kote spray system with the following operating parameters: Powder feeder speed of 4 rpm; Oxygen flow rate of 445 scfh at 60 psi; Hydrogen (fuel) flow rate of 1040 scfh at 70 psi; Argon (powder carrier gas) flow rate of 25 scfh at 100 psi; Damping Material Deposition Rate of 30 grams/minute; and a standoff distance of 10 inches.

The presently disclosed method may be utilized to apply a layer of ferromagnetic damping coating (10) having a balanced coating residual stress to any number of substrates (20) to provide high damping without having to perform a high temperature annealing process. Such substrates (20) may include fan blades, compressor blades, impellers, blisks, and integrally bladed rotors (IBRs), just to name a few.

It is well known that when titanium and titanium alloys are subjected to a high temperature heat treatment, an oxygen-enriched layer, known as alpha case, will form on the surface of the titanium or titanium alloy. The alpha case is generally much harder and more brittle than the titanium or titanium alloy. For example, the alpha case layer generally has a Vicker's hardness number ranging from about 500 to 600, while the bulk hardness (i.e., the interior hardness) of the titanium or titanium alloy ranges from about 200 to 350. Depending on the temperature and the amount of time of the heat treatment, the alpha case layer thickness may be within a range from about 25 μm to about 200 μm. Moreover, a titanium or titanium alloy component that has been coated may still be susceptible to the formation of an alpha case layer. This can occur when oxygen diffuses through the coating layer and into the titanium or titanium alloy substrate microstructure just below the interface created between the coating layer and the surface of the titanium or titanium alloy substrate.

For many applications, an alpha case layer is highly undesirable because it has reduced fatigue resistance and tends to create a series of microcracks, which can reduce the metal's performance and cause failure. Generally, before the heat treated titanium or titanium alloy is utilized, the layer of alpha case must be removed by a chemical etching process or by mechanical means.

In one particular embodiment, a turbine component comprising a titanium based substrate (20) having a substrate thickness (22), a surface (24), and a bulk hardness may be coated by the presently disclosed method. The titanium based substrate (20) may be formed of commercially pure titanium, Ti-6Al-4V, or other titanium based alloys. In this embodiment, a ferromagnetic damping coating (10) layer is affixed to at least a portion of the surface (24) of the titanium based substrate (20), thereby providing a coated substrate (100) and defining a coating-substrate interface. The ferromagnetic damping coating (10) may comprise one of the ferromagnetic damping materials previously noted.

The ferromagnetic damping coating (10) has a balanced coating residual stress and the balanced coating residual stress includes at least a tensile quenching stress component and a compressive peening stress component such that the balanced coating residual stress is within a range of about ±50 MPa. The ferromagnetic damping coating (10) may have a coating thickness (12) of about 2% to about 20% of the substrate thickness (22). Moreover, the coated substrate (100) has a damping loss factor of at least $3.6 \times 10^{-3}$ at a strain amplitude of $0.0466 \times 10^{-4}$ to $7.77 \times 10^{-4}$.

Importantly, the damping loss factor is achievable without having to perform a high temperature annealing process, as previously noted. By avoiding a high temperature annealing process, the likelihood of developing a very hard and brittle alpha case layer at the coating-substrate interface is substantially reduced. As a result, in one embodiment, a hardness of the titanium based substrate (20) at the coating-substrate interface is within 25% of the bulk hardness (i.e., the interior hardness) of the titanium based substrate (20). In another embodiment, the hardness of the titanium based substrate (20) at the coating-substrate interface is within 5% of the bulk hardness of the titanium based substrate (20). The proximity of the hardness values indicate that very little, if any, alpha case has formed on the titanium based substrate (20). As a result, the turbine component comprising a titanium based substrate (20) is able to be damped by application of a ferromagnetic damping coating (10) without having to undergo a high temperature annealing process, and thereby substantially avoids the formation of unwanted alpha case that can lead to early component failure.

Numerous alterations, modifications, and variations of the preferred embodiments disclosed herein will be apparent to those skilled in the art and they are all anticipated and contemplated to be within the spirit and scope of the method for applying a low residual stress damping coating, as claimed below. For example, although specific embodiments and examples have been described in detail, those with skill in the art will understand that the preceding embodiments and variations can be modified to incorporate various types of substitute and or additional or alternative processes and materials, relative arrangement of elements, and dimensional configurations. Accordingly, even though only few variations of the method are described herein, it is to be understood that the practice of such additional modifications and variations and the equivalents thereof, are within the spirit and scope of the method as defined in the following claims.

I claim:

1. A turbine component, comprising:
    a) a metal based substrate (20) having a substrate thickness (22), a surface (24), and a bulk hardness; and
    b) a ferromagnetic damping coating (10) layer affixed to at least a portion of the surface (24) of the metal based substrate (20), thereby providing a coated substrate (100) and defining a coating-substrate interface, and wherein:
        i) the ferromagnetic damping coating (10) has a balanced coating residual stress and the balanced coating residual stress includes at least a tensile quenching stress component and a compressive peening stress component such that the balanced coating residual stress is within a range of about ±50 MPa;
        ii) the ferromagnetic damping coating (10) has a coating thickness (12) of about 2% to about 20% of the substrate thickness (22); and
        iii) a hardness of the metal based substrate (20) at the coating-substrate interface is within 25% of the bulk hardness.

2. The turbine component of claim 1, wherein a portion of the surface (24) of the metal based substrate (20) is plastically deformed as the coated substrate (100) is created by directing a partially molten ferromagnetic damping powder at the metal based substrate (20) with an application velocity of at least 450 m/s.

3. The turbine component of claim 1, wherein a portion of the surface (24) of the metal based substrate (20) is plastically deformed as the coated substrate (100) is created by directing a partially molten ferromagnetic damping powder at the metal based substrate (20) at an application temperature of at least 800° C.

4. The turbine component of claim 1, wherein the ferromagnetic damping coating (10) is applied to the metal based substrate (20) in a partially molten powder form and solidifies within 3 seconds.

5. The turbine component of claim 1, wherein the coated substrate (100) has a damping loss factor of at least $3.6 \times 10^{-3}$ at a strain amplitude of $0.0466 \times 10^{-4}$ to $7.77 \times 10^{-4}$.

6. The turbine component of claim 5, wherein the coated substrate (100) is not subjected to an annealing temperature of above 700° C. for an annealing period of longer than 30 minutes.

7. The turbine component of claim 1, wherein the ferromagnetic damping coating (10) comprises a material selected from the group consisting of, by weight percent: (a) about 16 percent chromium (Cr), about 1 percent to about 6 percent aluminum (Al), and the balance substantially iron (Fe); and (b) about 16 percent chromium (Cr), about 1 percent to about 4 percent molybdenum (Mo), and the balance substantially iron (Fe).

8. The turbine component of claim 1, wherein the ferromagnetic damping coating (10) comprises, by weight percent, about 22 percent to about 38 percent nickel (Ni), and the balance substantially cobalt (Co).

9. The turbine component of claim 1, wherein the hardness of the metal based substrate (20) at the coating-substrate interface is within 5% of the bulk hardness.

10. The turbine component of claim 1, wherein in the second bending mode the coated substrate (100) has a damping loss factor of at least $5.9 \times 10^{-3}$ at a strain amplitude of $0.227 \times 10^{-4}$.

11. The turbine component of claim 1, wherein in the third bending mode the coated substrate (100) has a damping loss factor of at least $5.7 \times 10^{-3}$ at a strain amplitude of $0.0568 \times 10^{-4}$.

12. The turbine component of claim 1, wherein the metal based substrate (20) comprises at least one of titanium, titanium-based alloy, steel alloy, nickel, nickel-based alloy, aluminum, and aluminum-based alloy.

13. A turbine component, comprising:
    a) a metal based substrate (20) having a substrate thickness (22), a surface (24), and a bulk hardness; and
    b) a ferromagnetic damping coating (10) layer affixed to at least a portion of the surface (24) of the metal based substrate (20), thereby providing a coated substrate (100) and defining a coating-substrate interface, and wherein:
        i) the ferromagnetic damping coating (10) comprises a material selected from the group consisting of, by weight percent: (a) about 16 percent chromium (Cr), about 1 percent to about 6 percent aluminum (Al), and the balance substantially iron (Fe); and (b) about 16 percent chromium (Cr), about 1 percent to about 4 percent molybdenum (Mo), and the balance substantially iron (Fe);

ii) the ferromagnetic damping coating (10) has a balanced coating residual stress and the balanced coating residual stress includes at least a tensile quenching stress component and a compressive peening stress component such that the balanced coating residual stress is within a range of about ±50 MPa without subjecting the coated substrate (100) to an annealing temperature of above 700° C. for an annealing period of longer than 30 minutes;

iii) wherein a portion of the surface (24) of the metal based substrate (20) is plastically deformed as the coated substrate (100) is created by directing a partially molten ferromagnetic damping powder at the metal based substrate (20) with an application velocity of at least 450 m/s; and iv) a hardness of the metal based substrate (20) at the coating-substrate interface is within 25% of the bulk hardness.

14. The turbine component of claim 13, wherein the partially molten ferromagnetic damping powder is directed at the metal based substrate (20) at an application temperature of at least 800° C. and solidifies within 3 seconds.

15. The turbine component of claim 13, wherein the coated substrate (100) has a damping loss factor of at least $3.6 \times 10^{-3}$ at a strain amplitude of $0.0466 \times 10^{-4}$ to $7.77 \times 10^{-4}$.

16. The turbine component of claim 13, wherein the hardness of the metal based substrate (20) at the coating-substrate interface is within 5% of the bulk hardness.

17. A turbine component, comprising:

a) a metal based substrate (20) having a substrate thickness (22), a surface (24), and a bulk hardness; and b) a ferromagnetic damping coating (10) layer affixed to at least a portion of the surface (24) of the metal based substrate (20), thereby providing a coated substrate (100) and defining a coating-substrate interface, and wherein:

i) the ferromagnetic damping coating (10) comprises, by weight percent, about 22 percent to about 38 percent nickel (Ni), and the balance substantially cobalt (Co);

ii) the ferromagnetic damping coating (10) has a balanced coating residual stress and the balanced coating residual stress includes at least a tensile quenching stress component and a compressive peening stress component such that the balanced coating residual stress is within a range of about ±50 MPa without subjecting the coated substrate (100) to an annealing temperature of above 700° C. for an annealing period of longer than 30 minutes;

iii) wherein a portion of the surface (24) of the metal based substrate (20) is plastically deformed as the coated substrate (100) is created by directing a partially molten ferromagnetic damping powder at the metal based substrate (20) with an application velocity of at least 450 m/s; and iv) a hardness of the metal based substrate (20) at the coating-substrate interface is within 25% of the bulk hardness.

18. The turbine component of claim 17, wherein the partially molten ferromagnetic damping powder is directed at the metal based substrate (20) at an application temperature of at least 800° C. and solidifies within 3 seconds.

19. The turbine component of claim 17, wherein the coated substrate (100) has a damping loss factor of at least $3.6 \times 10^{-3}$ at a strain amplitude of $0.0466 \times 10^{-4}$ to $7.77 \times 10^{-4}$.

20. The turbine component of claim 17, wherein the hardness of the metal based substrate (20) at the coating-substrate interface is within 5% of the bulk hardness.

\* \* \* \* \*